April 27, 1937.                A. A. JOHNSON                2,078,573
                       COMBINED TAILLIGHT AND STOP LIGHT
                              Filed Jan. 3, 1931
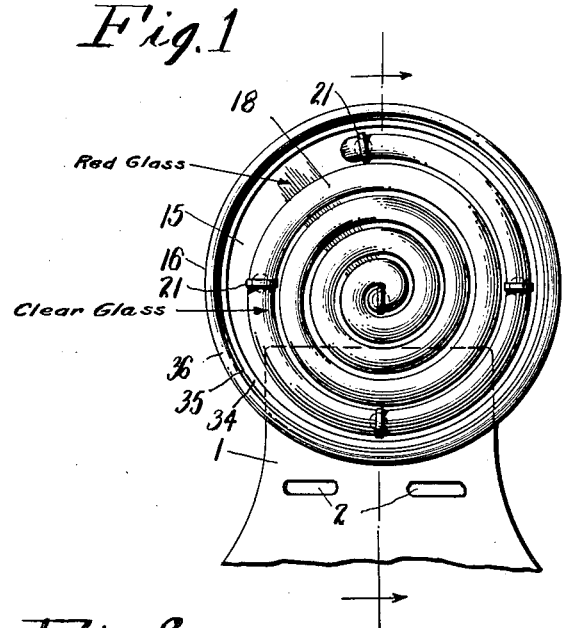
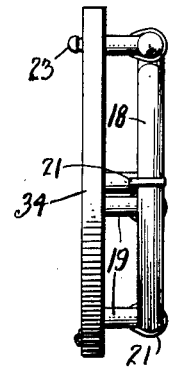
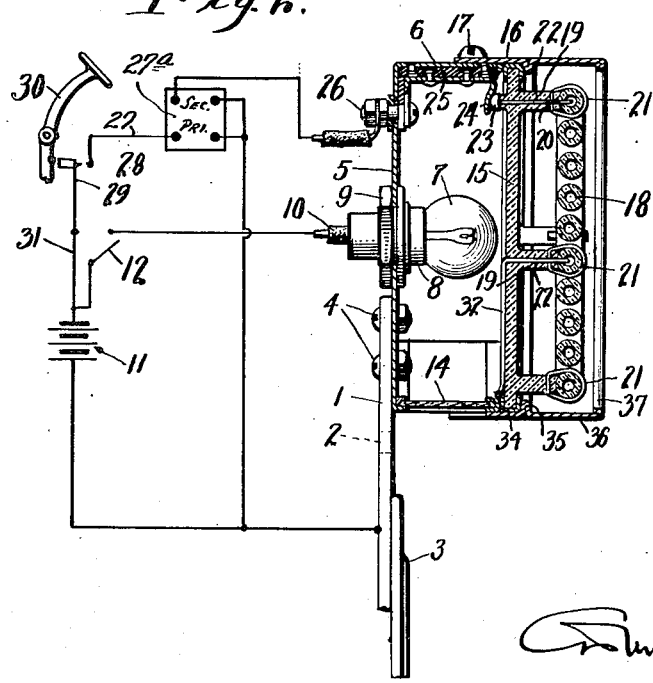
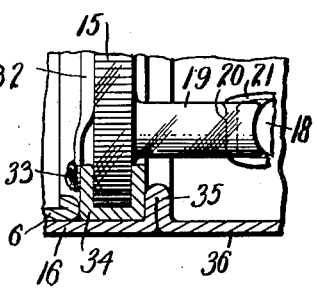
INVENTOR.

Patented Apr. 27, 1937

2,078,573

UNITED STATES PATENT OFFICE 2,078,573

COMBINED TAILLIGHT AND STOP LIGHT

Arthur A. Johnson, Bridgeport, Conn.

Application January 3, 1931, Serial No. 506,351

13 Claims. (Cl. 177—329)

This invention relates to motor vehicle lights, and more particularly, to rear end lights or signals adapted to be placed on motor vehicles.

An object of this invention is to provide a signal lamp for use on motor vehicles in which a tail light and a stop light may be so combined as to be economically made, small in size without loss of efficiency, and of greater usefulness in avoiding rear end collisions by giving an attention impelling stop signal.

These and other objects of the invention are accomplished in the preferred form thereof herein illustrated by interposing a luminous-gas tube arrangement between the usual or any suitable tail light lens at the point of vision behind the vehicle, and preferably the luminous-gas tube is of colorless, i. e. clear transparent, glass, so that the rays emanating from the usual tail lamp in passing through the lens thereof are not undesirably altered or effected by the presence of the luminous-gas tube.

The arrangement or construction of the luminous-gas tube per se to form a signal and the superimpositioning of several signals in the same field of vision forms the subjects-matter of my copending application, Serial No. 494,019, filed November 7, 1930, which has matured into Patent No. 2,042,316 in which is claimed the parts of invention disclosed and not claimed herein. Preferably, in a combined tail light and stop light such as is shown herein, the luminous-gas tube is structurally connected with the lens of the tail light as a removable and replaceable unit, and this constitutes an important feature of the present invention. However, it should be understood that it is within the scope of this invention to have the tail light lens and luminous-gas tube structurally independent and removable and replaceable as such.

Other objects and advantages will hereinafter appear.

In the accompanying drawing which shows one form of this invention—

Figure 1 is a rear elevation of the device of the present invention, showing the bracket by means of which it may be attached to a suitable support at the rear of the motor vehicle.

Fig. 2 is a vertical sectional view through the signal lamp and showing in diagrammatical form, separate electrical means for connecting the tail light and the stop light to a source of current.

Fig. 3 is a side elevation of the removable and replaceable unit consisting of the lens for the tail lamp and the luminous tube stop light.

Fig. 4 is a detail sectional view of part of the casing, showing the manner in which the unit shown in Fig. 3 is supported therein.

Referring to the accompanying drawing, 1 indicates a bracket which is provided with apertures 2 to receive bolts by means of which the device may be secured at any suitable or desirable position on the rear of a motor vehicle. This bracket 1 is adapted to support the usual license plate 3 and at its upper end has bolts 4 connecting it to a casing 5 of the device.

The casing 5 may have any suitable or desirable shape but is shown as a cylindrical box having side walls 6 forming a hollow chamber in which a bulb 7 is located. This bulb 7 is mounted in a socket 8 clamped to the rear wall of the box 5 by a lock-nut 9 and connected by a wire 10 to a source of current 11 when a switch 12 is thrown to close the circuit, including said wire 10 and a grounding wire 13 in current-conducting relation with the box 5 through its mounting on the bracket 1. The wall 6 of the box at its lower portion is cut-away or interrupted to receive a window of clear glass 14 so that light from the bulb 7 may pass therethrough and illuminate the license plate 3.

As usual in stop light lamps, there is provided a lens 15 for closing the rear of the box and this lens is usually made of red glass to give a danger signal to approaching vehicles, the lens 15 being held in place by a cap 16 having a flange secured to the wall 6 of the box by a screw 17 or the like. As will appear below, the lens 15 and cap 16 are not the same as those usually provided.

Heretofore, it has been common to provide a stop light made operative by the brake mechanism of the vehicle to warn approaching vehicles that the brakes have been applied so that closely following vehicles may correspondingly decelerate and thus avoid rear-end collisions. These stop lights have been combined with the tail lights by being placed side by side, or one above the other, requiring a casing occupying a space substantially equal to the sum total of two lamps of the same size. This is avoided by the present invention by superimposing the stop light on the tail light so as to permit the combined tail light and stop light to be placed in a casing substantially the same size as that of an ordinary stop light and effecting not only a saving in material and manufacturing cost but enhancing the appearance of the vehicle carrying the same.

This is accomplished in the form of the invention shown herein without impairing the operation of the tail light or its visibility by employing a neon or other luminous-gas tube as a light-producing element of the stop light, for such light generators may be produced of clear glass and yet generate colored rays.

Hence, as shown in the accompanying drawing, there is superimposed on the lens 15 of the tail light a luminous-gas tube 18 of clear glass through which the red colored rays of the tail lamp may pass. As shown in the accompanying drawing, this luminous-gas tube 18 is an endless tube forming a closely compact spiral in accordance with the teachings of my copending application, Serial No. 494,019, filed November 7, 1930, so as to produce a solid field of light when the tube is energized by current of electricity and caused to glow. By being colorless, the interpositioning of the luminous-gas tube 18 between the tail light lens 15 and the point of vision does not alter the rays of light emanating from the tail lamp and colored by the lens 15 except as to direction, and this is an advantageous feature of the present invention, for instead of having the lens 15 provided with annular grooves or beads to diffuse light as is common, it may be made plain—the light being sufficiently diffused by passing through the spirally wound luminous-gas tube 18.

The light generated by the tube 18 is preferably of a reddish hue, of a shade commonly recognized as that produced by a neon tube. Hence, when the tube 18 is caused to generate light, the normal reddish glow of the tail lamp is augmented and added to by the different shade of red produced by the neon light, and this change in the volume and tone of the light will quickly attract the attention of a driver of a closely following vehicle and warn him, as he would be warned by a separate stop light, that the brakes of the car ahead have been applied. Moreover, the signal produced by the neon or other luminous-gas tube 18 is more quickly noticed than that produced by an ordinary colored lens, due to the fact that it is colored without passing through a filter lens and due to the ability of the light emanating from such a tube to illuminate moisture and other particles in the air. Hence, the stop light of the present invention is more efficient and effective in foggy weather or in dust ladened air.

According to the present invention, the luminous-gas tube 18 may be superimposed with relation to the lens of the tail lamp in any suitable way. However, it is preferable and of considerable advantage to have the luminous-gas tube 18 and lens 15 form a single removable and replaceable unit so as to give a fixed and secure support to the luminous-tube. Hence, as shown, the lens 15 is provided with lugs 19 at several points thereon and shaped to engage the luminous tube. The lugs 19 may be provided with transverse slots 20 through which strips 21 may pass to hold the luminous tube to the lugs as a unit.

To permit an electrical connection to be made to the luminous tube and yet have it mounted for quick removal and replacement, the anode and cathode at the ends of the luminous tube extend through wire-clearance passages in the inner and outer lugs 19 as shown at 22.

One of these members 22 is provided with a contact point 23 adapted to engage a contact 24 secured to the wall 6 of the casing 5 and insulated therefrom by a block of insulation 25. The other end of this contact 24 is electrically connected with a binding post 26 to which a wire 27 is connected. This wire 27 leads to an interrupter type induction coil 27a connected to a contact point 28 adapted to be engaged by a switch blade 29 actuated by the brake pedal or other brake mechanism 30. The switch blade 29 is connected by a wire 31 to the source of current 11.

The other member 22 is connected by a wire 32 as by solder 33 to an annular metal flange or ferrule 34 on the periphery of the lens 15 (see Fig. 4) and this being in contact with the walls 6 of the box 5 when the lens is supported therein completes the other side of the circuit to the source of current 11 through the bracket 1 and grounding wire 13. Hence, when the brake pedal 30 is depressed, the luminous-gas tube is energized and light is generated thereby.

The removable and repaceable unit consisting of the lens 15 and luminous-gas tube 18 is held to the casing 5 by the cap 16 by the latter having an annular inwardly extending flange 35 engaging the outer surface of the lens (see Figs. 2 and 4). The cap 16 may terminate at the flange 35 if desired. However, to protect the luminous-gas tube 18 against casual contact with other things, the cap 16 has a rearwardly extending tubular portion 36 which reaches beyond the luminous-gas tube and this at its end may have a bead 37. Thus, to replace the luminous-gas tube should it become broken, the screws 17 are loosened and the cap 16 is slid off the casing 5 giving access to the lens 15 and luminous-tube 18 which may be slid out as a unit and be replaced by a new one.

Variations and modifications may be made within the scope of this invention and portions of the improvements may be used without others.

Having thus described the invention, what is claimed as new and for which it is desired to obtain Letters Patent, is:

1. A lens for a combined tail light and stop light for vehicles having a luminous-gas tube bent into compact form to substantially cover the lens, and means encircling the tube for securing the latter to the lens.

2. A lens for a rear light for vehicles having posts formed on one face, a luminous-gas tube, and means for supporting said tube by and on said posts.

3. A rear light for a motor vehicle comprising an open faced casing; a light within the casing and supported thereby; a colored pane closing the open face of the casing to pass light rays rearwardly of the lamp in a direction toward an observer; an inert-gas electric lamp having a long clear glass tube body formed to overlie substantially the entire area of the pane; and means for mounting said inert-gas lamp exteriorly of the pane and in the optical path of the light passing through the pane so that the inert-gas tube of the second lamp serves to refract the rays passing through the pane, and so that the colored rays emanating from the inert-gas lamp may pass directly into the field of vision in warning direction.

4. A combined tail light and stop light for vehicles comprising a casing; a lamp located therein; contacts carried by the casing; a lens in an opening in the casing; a luminous-gas tube; means for supporting the latter by and on said lens, said tube covering a substantial portion of said lens, and located in the same field of vision as the lens; and contacts for the luminous-gas tube carried by the lens and adapted to cooperate with the contacts on the casing when the lens is in place to form a wall of the casing.

5. A lens for a vehicle rear light, having posts with cradles formed on one face, a luminous-gas tube having portions lying in said cradles on said posts, and means for securing said tube to said posts, the posts and cradles thereon serving respectively to support and to locate the luminous-gas tube relative to the lens.

6. A combined tail light and stop light for vehicles comprising a casing; a lamp located therein; a colored transparent plate in an opening in the casing; a luminous gas tube; and means for supporting said tube by and on the exterior side of the transparent plate, said tube being shaped to substantially cover the exposed area of said transparent plate and being made of uncolored glass to diffuse and refract without filtering the colored light rays emanating from said colored transparent plate, and the latter reflecting light produced by the luminous gas tube when the latter is energized toward the exterior of the casing.

7. A combined primary and secondary light transmitting medium for a combined tail light and stop light for vehicles comprising a plate of tinted glass forming a primary light transmitting medium, a luminous-gas tube of clear glass bent in compact form to produce a secondary light transmitting medium substantially covering one face of the tinted glass, and means for supporting said tube by and on the exterior side of said glass plate so as to refract and diffuse colored light rays emerging from said tinted glass plate without filtering the same, the light from said tube producing a colored light when the tube is energized and being reflected by said tinted glass plate on which it is mounted.

8. A combined tail light and stop light for vehicles comprising an open faced casing; a lamp located therein; a colored lens closing the open face of the casing; and a luminous-gas tube bent into compact form to substantially cover the lens and supported on the exterior side of the lens.

9. A combined tail light and stop light for vehicles comprising an open faced casing; a lamp located therein; a colored lens closing the open face of the casing; and a clear glass luminous-gas tube bent into compact form to substantially cover the lens and supported on the exterior side of the lens.

10. A rear light for motor vehicles comprising an open faced casing; a light within the casing and supported thereby; a colored pane closing the open face of the casing and adapted to pass light rays rearwardly of the lamp in a direction toward an observer; and an auxiliary lamp located in the optical path of light passing through the colored pane exteriorly thereof and of the casing, said auxiliary lamp being formed of transparent material of uneven surface formation to diffuse and refract the rays emanating from said colored pane.

11. A lens for a rear light for vehicles adapted to pass rays therethrough from a light source; a secondary lamp; and means for supporting the latter by and on the obverse side of the lens, said secondary lamp being formed of transparent material of uneven surface formation and being bent into compact form to substantially cover the lens to diffuse and refract the light rays passing from the plain lens.

12. A signal unit including a signal opening, a colored lens mounted in said opening of said unit, a gaseous discharge tube shaped to substantially cover the exposed surface of said lens and which, when illuminated, displays a colored light through said opening, means for mounting said tube in said opening of said unit in front of said lens, a second source of illumination, and means for mounting said second source of illumination in said unit directly to the rear of said lens.

13. A signal unit having an open-faced casing; a lens closing the open-face of the casing; a luminous-gas tube shaped to substantially cover the lens and supported on the exterior side thereof, said tube being normally colorless but producing a colored light when energized; and a source of illumination located in the casing.

ARTHUR A. JOHNSON.